3,363,011
CYCLOBUTANE DERIVATIVES CONTAINING POLYUNSATURATED SUBSTITUENTS AND THEIR PREPARATION
Harris D. Hartzler, Wilmington, Del., assignor to E. I. du Pont de Nemours and Company, Wilmington, Del., a corporation of Delaware
No Drawing. Filed Sept. 10, 1964, Ser. No. 395,568
10 Claims. (Cl. 260—648)

ABSTRACT OF THE DISCLOSURE

Selected unsaturated derivatives of cyclobutane and their preparation by addition reactions of cumulenes.

Summary and details of the invention

This invention relates to, and has as its principal objects provision of, certain polyunsaturated derivatives of four-carbon ring compounds and methods for preparing the same.

PRODUCTS

The products of this invention are compounds of Formulas 1, 2, and 3:

(1) 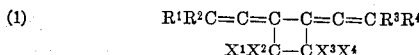

(2) 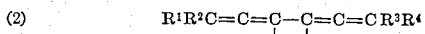

and (3) 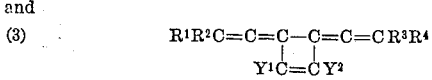

wherein: the R's are the same or different and are monovalent hydrocarbyl free of aliphatic unsaturation, i.e., hydrocarbyl in which any unsaturation is aromatic, bonded to the depicted carbons through carbon carrying at most one hydrogen or, in the case of the two R's bonded to a single carbon, divalent hydrocarbyl free of aliphatic unsaturation; the X's are the same or different and are hydrogen, fluorine, alkyl, or fluoroalkyl (including monofluoroalkyl and polyfluoroalkyl); and the Y's are the same or different and are hydrogen, alkyl, or perfluoroalkyl.

For reasons of availability, preferred products within the scope defined above are those in which the carbon content of the R groups attached to any one carbon is at most 14. Especially preferred products are those in which all the R's are the same and are hydrocarbyl groups free of aliphatic unsaturation and of at most seven carbons. Equally especially preferred products are those in which the R groups are bonded through carbon bearing no hydrogen.

Because of availability of starting materials, preferred products of Formula 1 are those in which the

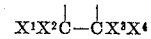

group contains at most seven carbons. For the same reason, products of Formula 1 comprising another preferred class are those in which the

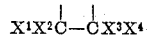

groups are divalent hydrocarbyl or divalent fluorocarbyl. Especially preferred products of Formula 1 are those in which each X is fluorine.

For the same reason, preferred values of Y are hydrogen, lower alkyl, and lower perfluoroalkyl, particularly lower perfluoroalkyl.

It will be evident that in appropriate cases of asymmetrical substitution, some of the present novel compounds can exist as geometrical isomers. Such isomeric forms are included within the invention.

PROCESSES

The products are prepared by cycloaddition reactions of the corresponding tetrahydrocarbylhexapentaenes, which are members of the class of compounds known generically as cumulenes.

*Process I.*—Products of Formula 1 are prepared by reacting a tetrahydrocarbylhexapentaene of Formula 4

(4) 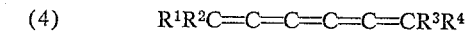

where the R's are as defined above, with an ethylenically unsaturated compound of the formula $X^1X^2C=CX^3X^4$ of up to seven carbons, where the X's are as defined above. This process is illustrated in Example 1.

*Process II.*—Products of Formula 2 are prepared by heating a tetrahydrocarbylhexapentaene of Formula 4 in the absence of a coreactant. In this process, two molecules of the cumulene undergo cycloadditive dimerization, or cyclodimerization, as illustrated in Example 2.

*Process III.*—Products of Formula 3 are prepared by reacting a tetrahydrocarbylhexapentaene of Formula 4 with an acetylenic coreactant of the formula $Y^1C\equiv CY^2$, where $Y^1$ and $Y^2$ are as defined above.

All three processes can be carried out at temperatures between about 50° C. and the decomposition temperatures of the products. Temperatures of about 150–250° C. are preferred. An inert solvent can be used in each process but is not required.

The processes can all be carried out at subatmospheric, atmospheric, or superatmospheric pressures. Process II is conveniently run at atmospheric pressure. Since most of the ethylenic and acetylenic reactants used in Processes I and III boil below the preferred temperatures at which the processes are carried out, it is convenient to run these processes at the autogenous pressures of closed systems. The yields in these two processes can be increased by increasing the pressure, especially when the ethylenic or acetylenic reactant is a gas under ordinary conditions. For ethylenic reactants in particular, pressures as high as several thousand atmospheres can be used to advantage, with repressuring of the ethylenic reactant if desired.

In Processes I and III, the mole ratio of reactants is not critical. Usually the ethylenic or acetylenic coreactant will be both more readily available and more easily removed from the final product mixture than the cumulene reactant; it is convenient, therefore, to use a considerable excess of the former to insure complete consumption of the latter. Coreactant/cumulene mole ratios as high as 50/1 are advantageously used, particularly when the coreactant is a gas under ordinary conditions.

PROPERTIES

The products of the invention are well-defined crystalline solids, stable to air and water at ordinary temperatures. They can be isolated and purified by recrystallization from common organic solvents or by sublimation.

The tetrahydrocarbylhexapentaenes used as starting materials are members of a known class of compounds. See, for example, Cadiot et al., Bull. Soc. Chim. France, 1961, 2176. They can be prepared by coupling reactions of the corresponding dihydrocarbylethynylcarbinols, which are in turn made from ketones and acetylene. Specifically, the preparations of diphenylethynylcarbinol and tetraphenyl hexapentaene from benzophenone are described by Hartzler, J. Am. Chem. Soc., 83, 4990 (1961). Tetra-t-butylhexapentaene, used in Examples 1, 2, and 3, can be prepared by the same method from di-t-butyl ketone. Unsymmetrical tetrahydrocarbylhexapentaenes of Formula 4, in which the R entities at the ends of the carbon chain are different, are prepared by the same type of coupling reaction of two different dihydrocarbylethynylcarbinols.

EXAMPLES

The following nonlimiting examples illustrate the products of this invention.

*Example 1.—1,2-bis(di-t-butylvinylidene)-3,3,4,4-tetrafluorocyclobutane*

[(CH$_3$)$_3$C]$_2$C=C=C—C=C=C[C(CH$_3$)$_3$]$_2$
+
CF$_2$=CF$_2$ ⟶

[(CH$_3$)$_3$C]$_2$C=C=C—C=C=C[C(CH$_3$)$_3$]$_2$
            |    |
           F$_2$C—CF$_2$

A tubular glass reactor was charged with 0.92 g. of tetra-t-butylhexapentaene and 20 ml. of benzene, cooled in liquid nitrogen, evacuated, charged additionally with 7.3 g. of tetrafluoroethylene, and sealed. The reactor was then heated at 200° C. and autogenous pressure for six hours, cooled, and opened. Volatile materials were removed by evaporation, and the solid residue was crystallized from methanol to give 0.93 g. (70%) of 1,2-bis(di-t-butylvinylidene) - 3,3,4,4 - tetrafluorocyclobutane, M.P. 128–130° C. A second recrystallization from methanol gave a product melting at 129.5–130.5° C.

*Analysis.*—Calcd. for C$_{24}$H$_{36}$F$_4$: C, 72.0; H, 9.06; F, 19.0. Found: C, 71.9; H, 8.95; F, 18.8; C, 72.2; H, 8.98; F, 18.7.

The infrared absorption spectrum of the product (potassium bromide disk) showed absorption characteristic of saturated C—H, saturated C—F, and allenic C=C. There was no absorption characteristic of any other kind of carbon-carbon unsaturation. The fluorine (F$^{19}$) n-m-r (nuclear-magnetic-resonance) spectrum showed only one sharp resonance, which was +2520 c.p.s. from 1,2-difluoro-1,1,2,2-tetrachloroethane at 56.4 mc. The hydrogen n-m-r spectrum showed one sharp resonance at $\tau$=8.76.

By essentially the procedure of Example 1, with routine modifications as necessary, other tetrahydrocarbylhexapentaenes can be reacted with ethylenically unsaturated compounds to give products of the invention of Formula 1. Some of these reactants and products are shown in the following table.

*Example 2.—Tetrakis(di-t-butylvinylidene)cyclobutane*

[(CH$_3$)$_3$C]$_2$C=C=C=C=C=C[C(CH$_3$)$_3$]$_2$
+
[(CH$_3$)$_3$C]$_2$C=C=C=C=C=C[C(CH$_3$)$_3$]$_2$ ⟶

[(CH$_3$)$_3$C]$_2$C=C=C—C=C=C[C(CH$_3$)$_3$]$_2$
            |    |
[(CH$_3$)$_3$C]$_2$C=C=C—C=C=C[C(CH$_3$)$_3$]$_2$

Tetra-t-butylhexapentaene (0.30 g.) was heated in a glass reactor at 200° C. and atmospheric pressure for 15 minutes. The mixture was cooled, excess pentane was added, and the resulting suspension was filtered to give 0.27 g. (90%) of solid tetrakis(di-t-butylvinylidene)cyclobutane, M.P. 350–360° C. Recrystallization from xylene gave colorless crystals that melted at 361° C. without decomposition.

*Analysis.*—Calcd. for C$_{44}$H$_{72}$: C, 87.9; H, 12.1; M.W., 601. Found: C, 88.0; H, 12.0; M.W., 595 (ebull. in benzene).

The molecular-weight determination was carried out on a separate sample prepared as described above.

The infrared absorption spectrum of the product (potassium bromide disk) showed absorption characteristic of saturated C—H at 3.37$\mu$, 3.43$\mu$, and 3.47$\mu$, and absorption characteristic of allenic C=C at 5.12$\mu$ and 5.19$\mu$. No absorption characteristic of any other kind of carbon-carbon unsaturation was present. The proton n-m-r spectrum of the product showed one sharp resonance at $\tau$=8.80. The ultraviolet absorption spectrum of the product in tetrahydrofuran solution showed absorption at 3.16 m$\mu$ ($\epsilon$=2040), 2.98 m$\mu$ ($\epsilon$=1720), 2.68 m$\mu$ ($\epsilon$=13,200), 2.58 m$\mu$ ($\epsilon$=16,300), and 250 m$\mu$ ($\epsilon$=15,800).

Any of the tetrahydrocarbylhexapentaenes of the first column of Table I or the first column of Table II can be cyclodimerized by the process of Example 2 to give the corresponding tetrakis(dihydrocarbylvinylidene)cyclobutanes.

*Example 3.—3,4-bis(di-t-butylvinylidene)-1,2-bis-(trifluoromethyl)cyclobutene*

[(CH$_3$)$_3$C]$_2$C=C=C=C=C=C[C(CH$_3$)$_3$]$_2$
+
CF$_3$C≡CCF$_3$ ⟶

[(CH$_3$)$_3$C]$_2$C=C=C—C=C=C[C(CH$_3$)$_3$]$_2$
            |    |
           CF$_3$C=CCF$_3$

A tubular glass reactor was charged with 0.49 g. of tetra-t-butylhexapentaene and 7 ml. of benzene, cooled with solid carbon dioxide, exacuated, charged additionally with 10 g. of hexafluoro-2-butyne, and sealed. The re-

TABLE I

| Tetrahydrocarbylhexapentaene | Ethylenic Coreactant | Substituted Cyclobutane |
|---|---|---|
| (t-C$_5$H$_{11}$)$_2$C=C=C=C=C=C(t-C$_5$H$_{11}$)$_2$ | CF$_2$=CFCF$_3$ | (t-C$_5$H$_{11}$)$_2$C=C=C——C=C=C(t-C$_5$H$_{11}$)$_2$<br>　　　　　　　　　$\|$　$\|$<br>　　　　　　　CF$_2$—CFCF$_3$ |
| 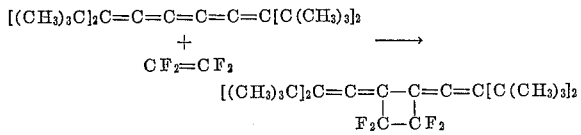 | CF$_3$(CF$_2$)$_2$CH=CHCH$_2$CH$_3$ | 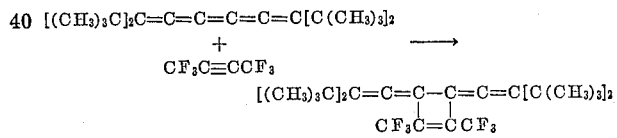 |
| (p-CH$_3$C$_6$H$_4$)$_2$C=C=C=C=C=C(p-C$_6$H$_4$CH$_3$)$_2$ | CH$_2$=CF$_2$ | (p-CH$_3$C$_6$H$_4$)$_2$C=C=C——C=C=C(p-C$_6$H$_4$CH$_3$)$_2$<br>　　　　　　　　　$\|$　$\|$<br>　　　　　　　CH$_2$—CF$_2$ |
| 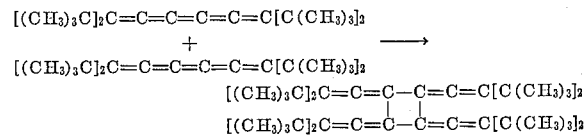 C=C=C=C=C=C | n-C$_5$H$_{11}$CH=CH$_2$ | C=C=C—C=C=C<br>　　　　$\|$　　$\|$<br>n-C$_5$H$_{11}$C—CH$_2$ |
| (C$_6$H$_5$)$_2$C=C=C=C=C=C(t-C$_4$H$_9$)$_2$ | CF$_2$=CF$_2$ | (C$_6$H$_5$)$_2$C=C=C——C=C=C(t-C$_4$H$_9$)$_2$<br>　　　　　　　$\|$　$\|$<br>　　　　　CF$_2$—CF$_2$ | actor was heated at 200° C. and autogenous pressure for four hours, cooled, and opened. Volatile materials were removed by evaporation, and the residual solid was crystallized from ethyl alcohol to give 0.34 g. (ca. 45%) of crude 3,4-bis-(di-t-butylvinylidene)-1,2-bis(trifluoromethyl)cyclobutene, M.P. 116–140° C. The product was purified by sublimation at about 130° C./0.4 mm. to give colorless crystals, M.P. 135.5–137° C.

*Analysis.*—Calcd. for $C_{26}H_{36}F_6$: C, 67.5; H, 7.85; F, 24.7. Found: C, 67.1; H, 7.92; F, 25.1.

The infrared absorption spectrum of the product (potassium bromide disk) was in complete agreement with the structure of the product in the above equation. It showed absorption at $3.39\mu$, $3.40\mu$, and $3.45\mu$ (saturated C—H); $5.05\mu$ and $5.10\mu$ (allenic C=C); $6.07\mu$ (cyclobutene C=C); and $7.25\mu$ [$(CH_3)_3C$—]. The ultraviolet absorption spectrum of this product in isooctane solution had $\lambda_{max}$. 270 m$\mu$. ($\epsilon$=11,100).

By essentially the method of Example 3, the tetrahydrocarbylhexapentaenes and acetylenic compounds shown in Table II can be reacted to form products of the invention.

The embodiments of the invention in which an exclusive property or privilege is claimed are defined as follows:

1. A compound of the group consisting of (1) 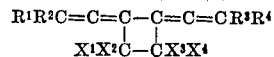

(2) 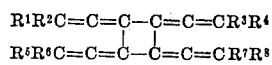

and (3) 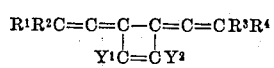

wherein:
the R's, in which any unsaturation is aromatic and which are attached to the depicted carbons through carbon bearing no hydrogen, are monovalent hydrocarbyl or, in the case of R's bonded to one carbon, divalent hydrocarbyl, the two R's bonded to any one depicted carbon having a total of up to 14 carbons;

TABLE II

| Tetrahydrocarbylhexapentaene | Acetylenic Coreactant | Substituted Cyclobutane |
|---|---|---|
| (structure with C=C=C=C=C=C bridged by two cyclohexyl groups on each side) | CH≡CH | (structure with C=C=C—C=C=C and CH=CH bridge) |
| $(o-CH_3C_6H_4)_2C=C=C=C=C=C(C_6H_5)_2$ | $CF_3C≡CCH_3$ | $(o-CH_3C_6H_4)_2C=C=C—C=C=C(C_6H_5)_2$<br>$CF_3C=CCH_3$ |
| (bis-tetramethylcyclobutyl hexapentaene structure) | $CH_3C≡CC_4H_9$ | (bis-tetramethylcyclobutyl with $CH_3C=CC_4H_9$ inserted) |

UTILITY

As shown by the following example, the products of the invention are generically useful as inhibitors of free-radical-initiated addition polymerization.

Example A

Two identical solutions were prepared, each containing 10 ml. of acrylonitrile, 30 ml. of benzene, and 0.05 g. of azobisisobutyronitrile. To one solution was added 0.10 g. of tetrakis(di-t-butylvinylidene)cyclobutane. The two solutions were heated at 60–70° C. with stirring in an atmosphere of nitrogen. The following observations were made on the two solutions:

| Time (hrs.:min.) | Solution Containing Tetrakis(di-t-butylvinylidene)-cyclobutane | Other Solution (Control) |
|---|---|---|
| 0:00 | Heating at 60–70° C. started. | Same. |
| 0:30 | No change. | Solid polyacrylonitrile separating. |
| 1:25 | Solution slightly hazy; solid polyacrylonitrile starting to separate. | Reactor filled with polymer. |

These observations show that the tetrakis(di-t-butylvinylidene)cyclobutane strongly inhibited the free-radical-initiated polymerization of acrylonitrile.

Since obvious modifications and equivalents in the example will be evident to those skilled in the chemical arts, I proposed to be bound solely by the appended claims.

the X's are selected from the group consisting of hydrogen, fluorine, alkyl, and fluoralkyl, the

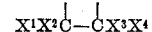

group containing up to 7 carbons; and
the Y's are selected from the group consisting of hydrogen, lower alkyl and lower perfluoroalkyl.

2. 1,2-bis(di-t-butylvinylidene)-3,3,4,4-tetrafluorocyclobutane.

3. Tetrakis(di-t-butylvinylidene)cyclobutane.

4. 3,4-bis(di-t-butylvinylidene)-1,2-bis(trifluoromethyl)cyclobutene.

5. The process of producing a compound of formula 2 of claim 1 which comprises heating, at a temperature between about 50° C. and about 250° C., a compound of the formula

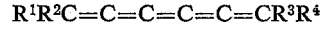

the R's being as in claim 1.

6. The process of producing a compound of Formula 2 of claim 1 which comprises heating, at a temperature between about 50° C. and about 250° C., a compound of the formula

with
a compound of the formula $X^1X^2C=CX^3X^4$ of up to 7 carbons,
the R's and X's being as in claim 1.

7. The process of producing a compound of Formula 3 of claim 1 which comprises heating, at a temperature between about 50° C. and about 250° C., a compound of the formula $$R^1R^2C=C=C=C=C=CR^3R^4$$

with
a compound of the formula $Y^1C\equiv CY^2$,
the R's and Y's being as in claim 1.

8. The process of producing the compound of claim 3 which comprises heating, at a temperature between about 50° C. and about 250° C., tetra-t-butylhexapentaene.

9. The process of producing the compound of claim 2 which comprises heating, at a temperature between about 50° C. and about 250° C. tetra-t-butylhexapentaene with tetrafluoroethylene.

10. The process of producing the compound of claim 4 which comprises heating, at a temperature between about 50° C. and about 250° C., tetra-t-butylhexapentaene with hexafluoro-t-butyne.

References Cited

Uhler et al.: J. Am. Chem. Soc., vol. 84, p. 3397 (1962).

Adams et al.: Organic Reactions, pp. 2, 34 to 36, 40, 43, and 47 (1962).

LEON ZITVER, *Primary Examiner.*

DANIEL D. HORWITZ, *Examiner.*

M. JACOB, *Assistant Examiner.*

UNITED STATES PATENT OFFICE
CERTIFICATE OF CORRECTION

Patent No. 3,363,011            January 9, 1968

Harris D. Hartzler

It is hereby certified that error appears in the above numbered patent requiring correction and that the said Letters Patent should read as corrected below.

Column 6, line 46, for "fluoralkyl," read -- fluoroalkyl,--; line 65, for "Formula 2" read -- formula 1 --.

Signed and sealed this 29th day of April 1969.

(SEAL)
Attest:

Edward M. Fletcher, Jr.
Attesting Officer

EDWARD J. BRENNER
Commissioner of Patents